(12) United States Patent
Silvers et al.

(10) Patent No.: US 7,752,764 B2
(45) Date of Patent: Jul. 13, 2010

(54) PENDULUM ACTUATED AUTOMATIC LEVELER

(76) Inventors: Robert Silvers, P.O. Box 128, Subic Bay Freeport Zone, ZA (PH) 2222; James Stone, P.O. Box 15341, Saan'a (YE)

( * ) Notice: Subject to any disclaimer, the term of this patent is extended or adjusted under 35 U.S.C. 154(b) by 313 days.

(21) Appl. No.: 12/118,765

(22) Filed: May 12, 2008

(65) Prior Publication Data
US 2009/0283657 A1    Nov. 19, 2009

(51) Int. Cl.
*G01C 9/06*    (2006.01)
*G01C 9/12*    (2006.01)

(52) U.S. Cl. ...................... 33/366.24; 33/291

(58) Field of Classification Search ............ 33/366.11, 33/366.24, 391, 401, 291; 248/475.1, 476, 248/480, 779
See application file for complete search history.

(56) References Cited

U.S. PATENT DOCUMENTS

| | | | | |
|---|---|---|---|---|
| 2,464,911 A | * | 3/1949 | White | 33/397 |
| 2,527,982 A | * | 10/1950 | Brock | 33/391 |
| 3,014,283 A | * | 12/1961 | Hofmann | 33/398 |
| 7,395,605 B2 | * | 7/2008 | Voecks | 33/345 |
| 2006/0010698 A1 | * | 1/2006 | Hayes et al. | 33/286 |
| 2006/0278799 A1 | * | 12/2006 | Newman | 248/475.1 |
| 2007/0214669 A1 | * | 9/2007 | Van Luchene et al. | 33/366.11 |
| 2010/0012813 A1 | * | 1/2010 | Mickel | 248/495 |

* cited by examiner

*Primary Examiner*—G. Bradley Bennett (57) ABSTRACT

An automatic apparatus for leveling suspended articles or hung objects to an angle relative to a reference. The shift lever assembly (112), used as a gravity reference, is activated when the pendulum member swings horizontally in response to slightest inclination or tilt, thereby causing the conductor pin (114.14) to contact one side of a pair of conductor plates (114.24*b*) or (114.24*b*). The contacting of the conductor pin to one side of the pair of conductor plates (114.24*b*) or (114.24*b*) completes the electrical circuit and allows the electrical storage device (118) to provide electrical current to the planetary motor (116), causing it to rotate. The turning of the planetary motor (116) causes the shift lever assembly (112) to automatically shift the elongated lever arm (112.10) against the rigid axle (122.22), thereby shifting the center of balance of the object in the opposite direction of the rotation of the wheel-like driven gear (112.20). Leveling occurs when the elongated lever arm (112.10) returns to its original vertical orientation, the conductor pin (114.14) is no longer in contact with either side of the pair of conductor plates (114.24*a*) or (114.24*b*), and the motor stops turning.

5 Claims, 4 Drawing Sheets

PENDULUM ACTUATED AUTOMATIC LEVELER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of Invention

The present invention generally relates to an apparatus and method for automatically leveling objects such as; paintings, photographs, documents, mirrors, and the like, that are suspended or hung from a mounting point on an even or uneven reference plane, and more specifically, to an automatic leveling apparatus having a shift lever assembly that automatically adjusts the inclination angle of a suspended or hung object to a level position, as determined under the influence of gravity, by way of a pendulum actuated switch.

2. Prior Art

People tend to display various objects for different purposes, such as; showing off their treasured photographs and paintings, displaying official documents including certificates, permits, and diplomas, or simply to adorn their bare walls. These objects are usually suspended from a mounting point on a vertical wall within a frame or other enclosing structure. The suspended object requires initial orientation and leveling to achieve a symmetric position with respect to a reference plane, and recurrent leveling to maintain said orientation. Accordingly, this reference plane principally refers to a ninety-degree angle to a wall of a house or building; wherein, most are constructed and raised in a vertical manner. Visual inspection from a distance is the most common way to judge whether an object suspended from a mounting point has a level orientation. Direct human intervention is the ordinary and simple, if not biased, approach to bringing an object back to level or its original orientation. The foregoing unassisted manual method of leveling an object suspended from a mounting point provides an inconsistent estimation and may require more than one person and multiple attempts to complete the course. Thusly, various apparatuses and methods have been disclosed in prior art, addressing the intricacy of leveling an object suspended from a mounting point using manual means and thereafter providing automatic leveling features as set forth hereunder, to wit:

U.S. Pat. No. 7,216,841, issued on May 15, 2007 to Dodig, provides a method and apparatus for hanging pictures and other wall objects using a fastening device having a clear, flexible, non-resilient carrier having at least two mounting hooks in parallel alignment, which are secured to the carrier for engaging wire mounting means on the back of the picture or wall object. Said carrier may include a leveling device, preferably a bubble level. This leveling device may be removably attached to the carrier by means of a snap or compression fit within a concavity or depression in the carrier to thereby allow repeated uses of the same leveling device.

U.S. Pat. No. 4,883,247, issued on Nov. 28, 1989 to Crandall, discloses a picture hanger and method of using the same for readily hanging articles in level manner. This hanger having a built-in leveling device will continue to remain level irrespective of any vibrations that may occur to the wall on which it may be mounted.

Among other various automatic leveling apparatuses and related methods existing in the prior art, only two (2) references are deemed relevant to the present invention. These are:

a) U.S. Publication No. 20060278799, published on 14 Dec. 2006 to Newman, involves a frame leveler wherein a pivotable, weighted bob is used as a gravity reference to control a lock that unlocks the extension of a cable on the side of a frame that is tilted up with respect to the other side, when the frame is not level. The extensible cable is let out until the frame is once again level, at which point the extensible cable is locked and prevented from extending further. When the frame side is titled down with respect to the other side, or the frame is level, the extensible cable is locked and prevented from extending on that side, and b) U.S. Publication No. 20070214669, published on 20 Sep. 2007 to Van Luchene and Mueller, pertaining to an automated leveling apparatus wherein when it is mounted to the lower right corner of the frame or other object, the apparatus is activated whenever the frame or object becomes misaligned. When either corner is lowered, the integral Tilt switch "senses" this misalignment and an electrical circuit is created or closed. This electrical circuit, in turn, supplies power to a DC motor, which causes the DC motor to turn, which then turns a gear that is further attached to a wheel. This wheel is positioned in the apparatus such that, when attached to the frame, the wheel will come in direct contact with the adjacent wall or other stationary mounting object. When the wheel turns, the frame is moved at the corner where the device is attached, thereby aligning the frame or object.

However, the aforementioned prior art references have certain limitations, disadvantages and design inconsistencies that need to be remedied.

With regard to the first relevant automatic leveling apparatus prior art reference, the frame leveler; the limitations, disadvantages and design inconsistencies as follows:

a) The weight of the bobs used in the gravity reference must be matched to the object to be leveled. Specifically, the bob's need to be adequate to counter the weight of the frame in order to facilitate leveling, without surpassing the weight that the frame can counter in the leveling process. This increases design complexity and, depending on the size and overall weight of the frame to be leveled, said comparable set of bobs can make the apparatus bulky and an impractical attachment to the back of a frame whose object is to rest near perpendicular against a flat surface.

b) Moreover, the mounting procedure for frame leveler is quite complex. One has to identify certain portions of the frame to mount the different parts of the frame leveler.

c) Finally, the frame leveler can only deploy the extensible cable on the high side of the hanging object until the reel containing said cable is fully extended. Once the reel is fully deployed, the frame leveler loses its ability to automatically level. Resultantly, human intervention is necessary to lift the weight of the frame off the leveling mechanism so that the cable that suspends the frame can retract back into its reel, restoring the devices ability to level misaligned objects.

Referring to the second relevant prior art referenced, the automated leveling apparatus, the limitations, disadvantages and design inconsistencies as follows:

a) For the automated leveling apparatus to work, the misaligned object should be completely resting/leaning on a generally solid, unmovable, and flat plane or object;

b) The automated leveling apparatus should include a material that will aid in generating traction or friction to work, thus, entails additional cost and complexity;

c) The gliding of the wheels of the automated leveling apparatus may cause undesirable marks on the surface. Accordingly, a support device or glide button is needed. This device may be made of any suitable material that will balance the hanging object properly while substantially offsetting the width of the installed apparatus. This again entails additional system cost and mounting complexity;

d) To function properly, the individual parts of the automated leveling apparatus must be installed on specific areas of the hanging object to be leveled, based on the size and weight of the hanging object, thus making the installation complicated and burdensome;

e) To alert the user that it is operating, the installation of a buzzer or Light Emitting Diode (LED) on the automated leveling apparatus is necessary;

f) The motor, gear, and wheel of the automated leveling apparatus turn in one direction if the tilt is on the right side and the opposite direction if the tilt is on the left side in order to realign the misaligned object. This necessitates either two motors, or a single motor that operates in forward and reverse modes, further increasing circuit complexity and component cost.

SUMMARY OF THE INVENTION

It is the object of the present invention to provide an automatic leveling apparatus that requires no human intervention to repeatedly return a misaligned object that is suspended from a mounting point to a level or to its original orientation.

Another object of the invention is to provide an inexpensive, lightweight, and easy to use apparatus and method of realigning an object suspended from a mounting point to a level orientation.

A further object of the invention is to provide an automatic leveling mechanism that can return to level orientation, misaligned objects that are suspended from a plane that is other than smooth, flat, and extending to all boundaries of said object.

Another object of the invention is to provide an automatic leveling apparatus that can align irregular, non-flat objects, multiple objects, or relatively large objects that are suspended from a mounting point.

A further object of the invention is to provide an automatic leveling apparatus that generates perceptible indication of its leveling operation.

Another object is to provide an automatic leveling apparatus that is compact, lightweight, easy and inexpensive to manufacture, and durable in its construction.

It is a further object of the present invention to provide an automatic leveling apparatus that does not consume power when it is in a level state.

Other objects of the invention will be apparent hereinafter from the specification and from the recital of the appended claims, particularly when read in conjunction with the accompanying drawings.

LIST OF REFERENCE NUMERALS

With regard to reference numerals used, the following numbering scheme is used throughout the drawings.

| LIST OF REFERENCE NUMERALS | |
|---|---|
| PART NUMERAL | PART DESCRIPTION |
| 100 | automatic leveling apparatus |
| 110 | receptacle base structure |
| 112 | shift lever assembly |
| 112.10 | Elongated lever arm |
| 112.12 | upper bore |
| 112.14 | lower bore |
| 112.16 | middle bore |
| 112.18 | support post |
| 112.20 | wheel-like driven gear |
| 112.22 | rigid axle |
| 112.24 | mechanical fastener |
| 112.26 | worm-like driving gear |
| 114 | pendulum actuated switch |
| 114.10 | pendulum member |
| 114.12 | embedded hole |
| 114.14 | conductor pin |
| 114.16 | Weight |
| 114.18 | bearing structure |
| 114.20 | pedestal member |
| 114.22 | open slot |
| 114.24 | pair of conductor plates |
| 116 | planetary motor |
| 116.10 | output shaft |
| 118 | electrical storage device |
| 200 | schematic diagram |
| 300 | alternative automatic leveling apparatus |
| 310 | reed relay |
| 310.10 | pair of electrical contacts |
| 310.12 | glass tube |
| 310.14 | pair of coil contacts |
| 310.16 | magnetic coil |
| 400 | alternative schematic diagram |
| 500 | exemplary application |
| 510 | portrait-oriented frame |
| 512 | backing unit |
| 520 | embedded hole |
| 522 | embedded hole |
| 524 | embedded hole |
| 526 | embedded hole |
| 530 | rechargeable electrical storage device |
| 532 | photovoltaic cell or array |
| 600 | schematic diagram |

DETAILED DESCRIPTION OF THE PREFERRED EMBODIMENTS

Figures 1, 1A:
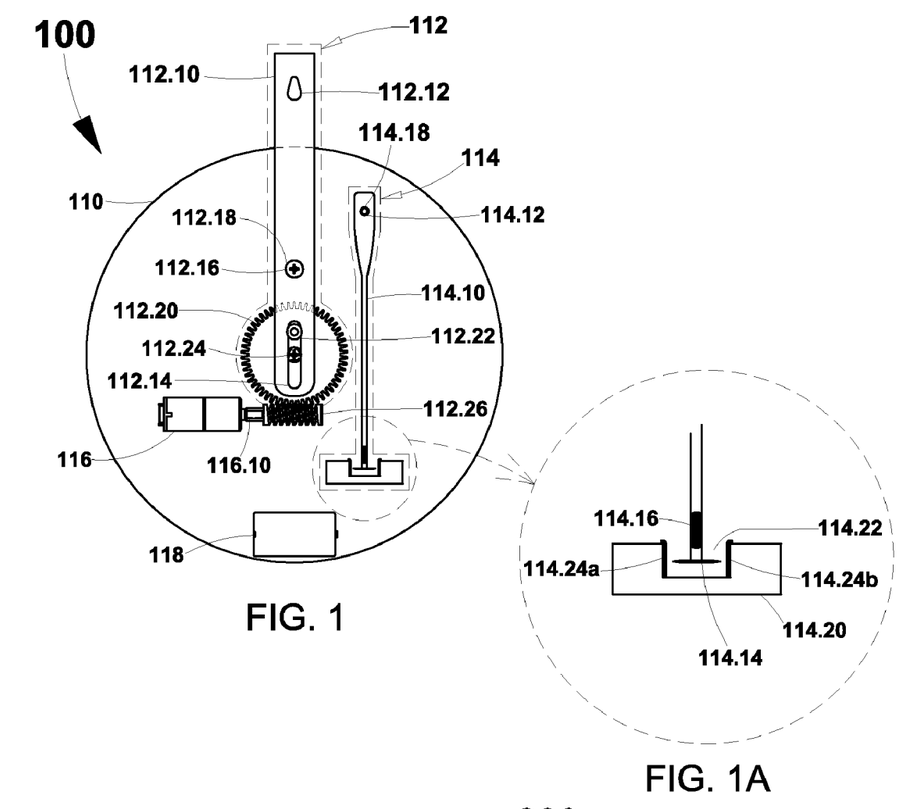
FIG. 1 is an end view of the automatic leveling apparatus of one preferred embodiment of the present invention illustrating the representative arrangement of its accompanying parts.
FIG. 1A is a fragmentary view, greatly enlarged, to clearly show an associated part of FIG. 1.

The features of the present invention which are believed to be novel are set forth with particularity in the appended claims. The structure and mode of operation of the present invention is further elucidated in the following descriptions, relating to the accompanying drawings, to wit:

Referring to FIG. 1, there is shown the end view of the preferred embodiment of the automatic leveling apparatus, generally referenced at numeral 100, illustrating the representative arrangement of its accompanying parts, which are described in accordance with the intended manner of operation and disclosed function thereof. The automatic leveling apparatus 100 predominantly includes a receptacle base structure 110. This receptacle refers to the structure that accommodates, secures, and protects the accompanying parts of the automatic leveling apparatus presented in this embodiment from dust, direct radiation, water or moisture intrusion, insect invasion, and similar potential hazards, thereby lengthening its operational life. Accordingly, the receptacle base structure 110 may be made of any known strong material. In the preferred embodiment, plastic has been used satisfactorily to reduce the weight of the receptacle significantly and to resist natural deterioration such as corrosion. The automatic leveling apparatus 100 further includes a shift lever assembly 112 that incorporates a first lever having an elongated arm 112.10 formed in a vertical manner along a pivot axis thereof. An upper bore 112.12 is embedded in the upper portion of the elongated lever arm 112.10, thereby enabling the reception of a fastening means (not illustrated) mounted to any vertical surface such as a wall or partition; while an elongated lower bore 112.14 is embedded in the lower portion of the same. The upper bore 112.12 is preferred to take a teardrop shape to provide improved locking for the fastening means (not illustrated) such as screws, bolts, and nails. The middle bore 112.16, serving as the pivot point of the elongated lever arm 112.10, is located in between the lower bore 112.14 and upper bore 112.12 and enables the reception of a support post 112.18 fixedly attached to the receptacle base structure 110. A second lever, having a wheel-like driven gear 112.20, is pivotally mounted on the center of gravity of the suspended or hung article. A rigid axle 112.22 is fixedly attached in a position perpendicular to driven gear 112.20. The rigid axle 112.22 has a headed support element received in the lower bore 112.14 that defines the limit of the movement thereof. The driven gear 112.20 is fixedly mounted on the determined center point of the receptacle base structure 110 using mechanical fastener 112.24; while the worm-like driving gear 112.26 interlocks with the wheel-like driven gear 112.20 to transmit the resultant rotational force created by the intersecting portion thereof, across the shift lever assembly 112. The shift lever assembly 112, which is configured to determine the center of gravity of the entire leveling device 100 for purposes of determining its level state, is intended to automatically shift the elongated lever arm 112.10 in response to an out of level condition. The planetary motor 116 has an output shaft 116.10 to receive and maneuver the worm-like driven gear 112.24 of the shift lever assembly 112 in single forward direction. The planetary motor 116 begins to turn when the electrical circuit is completed to the electrical storage device 118, by way of pendulum actuated switch 114. The electrical storage device 118 may refer to any known sources such as batteries, capacitors and the like.

Still referring to FIG. 1, there is shown the switch mechanism to operate the abovementioned shift lever assembly 112 thereby achieving the automatic leveling apparatus 100 of the present invention. Said electrical switch of the preferred embodiment takes the form of a pendulum actuated switch 114 that is tilt responsive in nature. The pendulum actuated switch 114 of the present invention includes a pendulum member 114.10 and a pedestal member 114.20. The pendulum member 114.10 has an embedded hole 114.12 on its top portion, and is suspended vertically and parallel to the identified reference plane, from a bearing structure 114.18 with low frictional force, thereby allowing a free oscillation horizontally, under the influence of gravity, to achieve equilibrium. While referring to FIG. 1A, there is shown a fragmentary view of FIG. 1, greatly enlarged to clearly show the accompanying parts at the bottom portion of the pedestal member 114.20; wherein, integrally attached in the pendulum member 114.20 is a conductor pin 114.14 with protruding ends. The conductor pin 114.14 is preferred to be plated with a substance that is highly conductive to electricity, such as gold or silver alloys, to provide for low contact resistance, protection against oxidative corrosion, and improved longevity. The conductor pin 114.14 is in electrical communication with one pole of the electrical storage device 118. Underneath the pendulum member 114.10 is a solid rectangular shape pedestal member 114.20 with an open slot 114.22 in its upper center surface. Said open slot 114.22 accommodates the preferred length of the conductor pin 114.14 in order to accommodate variable angles of inclination to which the pendulum actuated switch may respond. It is preferred, however, that a minimum space be provided to achieve a more tilt responsive pendulum switch. A pair of conductor plates, 114.24a and 114.24b communicates electrically with the planetary motor 116 through electrical wires that are disposed independently on the sides of the slotted pedestal member 114.20. It is also preferred that the pair of conductor plates 114.24a and 114.24b be plated with a substance that is the same or similar to that of the conductor pin 114.14. Thusly, the electrical contact between the conductor pin 114.14 and one side of the pair of conductor plates 114.24a and 114.24b provides low contact resistance, protection against oxidative corrosion, and improved longevity. Furthermore, the pendulum member 114.10 contains a weight 114.16 positioned near the bottom part thereof. The weight 114.16 of the pendulum member 114.10, hanging under the influence of gravity, moves from its center point when the suspended or hung object is in an unlevel state. When the shift of the pendulum member 114.10 is sufficient to cause it to contact one side of the exposed lateral surface of the pair of conductor plates 114.24a and 114.24b, the electronic circuit is completed and electrical current is allowed to flow from the electrical storage device 118 to power the motor 116. The motor 116 drives the leveling process by rotating the output shaft 116.10, which turns the wheel-like driven gear 112.20 in a single designed direction, which in turn, operates the shift lever assembly 112 to achieve a level state of the hanging or suspended object. Once a level state is achieved, gravity returns the pendulum member 114.10 to its original central point, thereby breaking the electrical contact of the pendulum member 114.10 and returning the system to a state of equilibrium.

Figure 2:
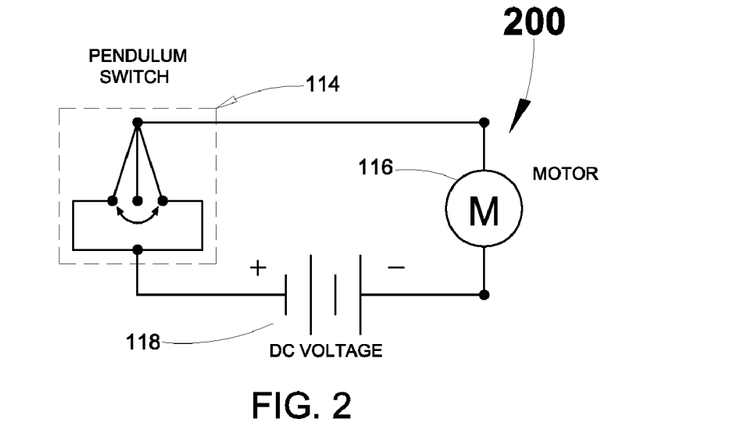
FIG. 2 is a schematic diagram illustrating the electrical communication means of FIG. 1.

Referring to FIG. 2, a schematic diagram 200 of FIG. 1 is shown illustrating the electrical communication between the motor 116, pendulum actuated switch 114 and electrical storage device 118. In the preferred embodiment, the electrical storage device 118 may contain a direct current (DC) voltage to supply electrical power for activating the motor 116 by way of the pendulum actuated switch 114. A direct current (DC) storage device is preferred in this embodiment to take the form of a battery to operate the automatic leveling apparatus 100. In another embodiment, the power to operate the motor may be obtained from an alternating current (AC) supply and converted to direct current (DC) using a rectifier (not illustrated).

Figure 3:
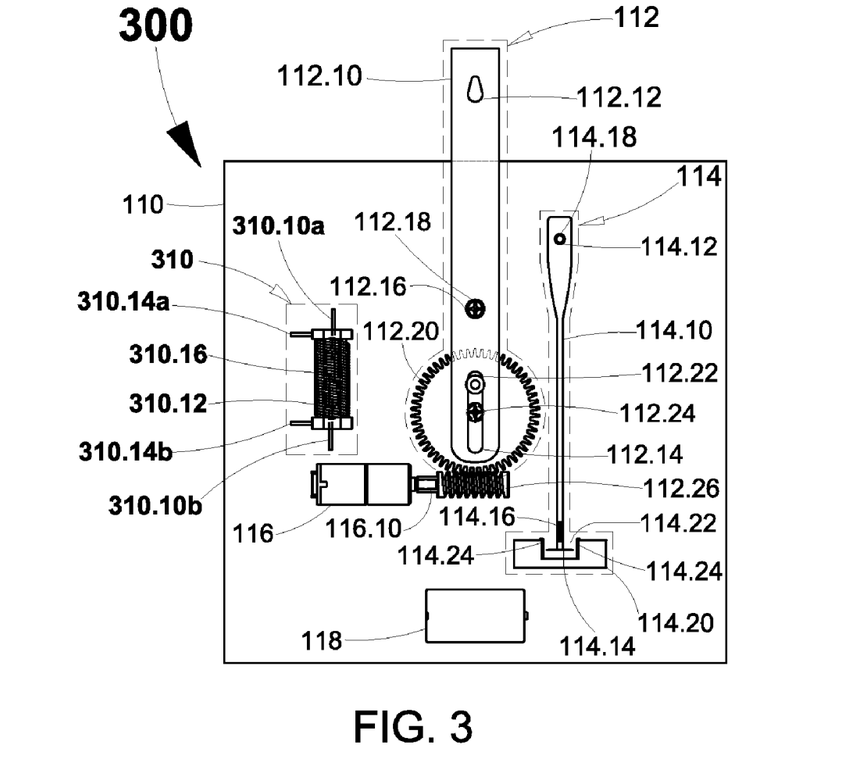
FIG. 3 is an end view of the automatic leveling apparatus of another preferred embodiment of the present invention illustrating the representative arrangement of its accompanying parts.

Referring to FIG. 3, there is shown an alternative embodiment of the automatic leveling apparatus of the present invention 300. It desirable that the automatic leveling device 100 of the present invention provide an alternative means to amplify the electrical flow in the preferred embodiment FIG. 1 that can control an output circuit of higher power than the input circuit, is capable of faster switching speeds than larger types thereof, while still maintaining low switch current and voltage ratings. Thusly, an appropriate electrical switch such as reed relay 310 is shown in this preferred embodiment. Reed relay 310 has a pair of switch contacts 310.10a and 310.10b and is protected from atmospheric corrosion by a glass tube 310.12. The coil contacts 310.14a and 310.14b are closed by a magnetic field generated when electrical current passes through a magnetic coil 310.16 around the glass tube 310.12.

Figure 4:
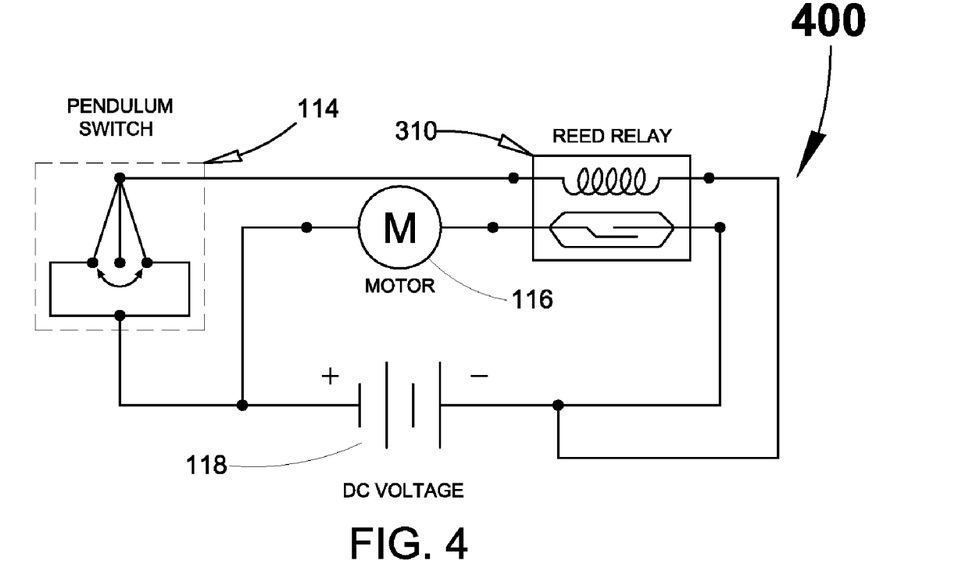
FIG. 4 is a schematic diagram illustrating the electrical communication means of FIG. 3.

Referring to FIG. 4, a schematic diagram 400 of FIG. 3 is shown illustrating the electrical communication between; the motor 116, the pendulum actuated switch 114, the electrical storage device 118, and the reed relay 310. The reed relay 310 is primarily intended to serve as an electrical amplifier, thereby controlling an output circuit of higher power than the input circuit and providing faster switching speeds than larger types thereof.

Figure 5:
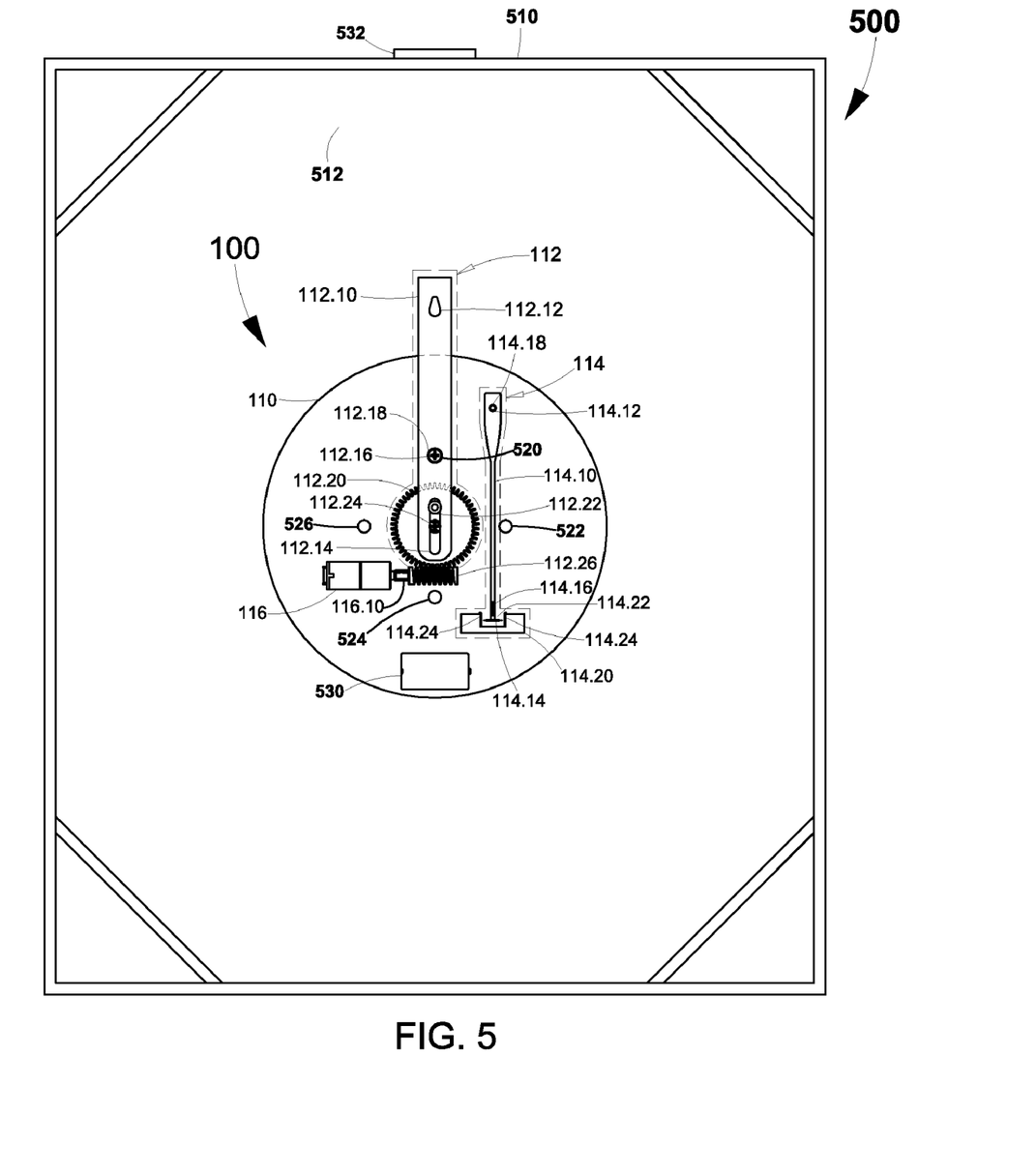
FIG. 5 is a view illustrating an exemplary use of the automatic leveling apparatus of the present invention in a portrait-oriented frame.

Referring now to FIG. 5, it is perceived that the preferred embodiment employ picture frames, mirror frames and the like. To achieve better comprehension of the automatic leveling apparatus 100 of the present invention disclosed herein, there is shown the exemplary application of the automatic leveling apparatus 100, generally referenced at numeral 500 in a portrait-oriented frame 510. The aforementioned application of the present invention does not limit the scope of the concept and method as set forth in affixed claims. The method of using the automatic leveling apparatus 100 for leveling objects in any form of frame orientation such as frame 510, to any substantially vertical surface (not illustrated), involves determining the center of gravity of the portrait-oriented frame 510, particularly the backing unit 512 of frame 510, wherein the center point of the automatic leveling apparatus 100 can be fixedly mounted thereon. As further depicted in FIG. 5, the automatic leveling apparatus 100 can be rotated pivotally on the common center point of the frame 510 to achieve desired orientation of said frame whereof various types can take a portrait or landscape orientation. To facilitate the easy rotation of the automatic leveling apparatus 100, multiple embedded holes 520, 522, 524 and 526 are in polar distant positions with respect to the center point of the receptacle base structure 110 and frame 510. In this manner, the middle bore 112.16, serving as pivot point of the elongated lever arm 112, may be detached from its original attachment position of embedded hole 520 and fixedly attached to embedded hole 522, 524 or 526. This new attachment point moves the pivot point and effectively changes the orientation of the frame 510 as it is suspended from upper bore 112.12. Herein embodiment further discloses a rechargeable electrical storage device 530 that may receive electrical power from converted light energy by way of a photovoltaic cell or array 532. Photovoltaic cells are known in the art to convert visible light into direct current (DC) electricity. It is therefore preferred that the electrical storage device is rechargeable in nature and is in electrical communication with the photovoltaic cell or array 532, strategically mounted facing the nearest available light source to frame 510. Accordingly, said electrical communication between the photovoltaic cell or array 532 and rechargeable storage device 530 may be employed using wireless technology or a circuitry that involves a physical wiring system. Said wiring system may be securely installed on the back of the frame 510, or inside the receptacle base structure 110. The output of the photovoltaic cell or array will be reduced during nighttime, or instances wherein little or no light source is available. In this regard, the electrical storage device 118 is designed to provide sufficient reserve capacity to ensure full operational strength during times of reduced light as described in this embodiment.

Figure 6:
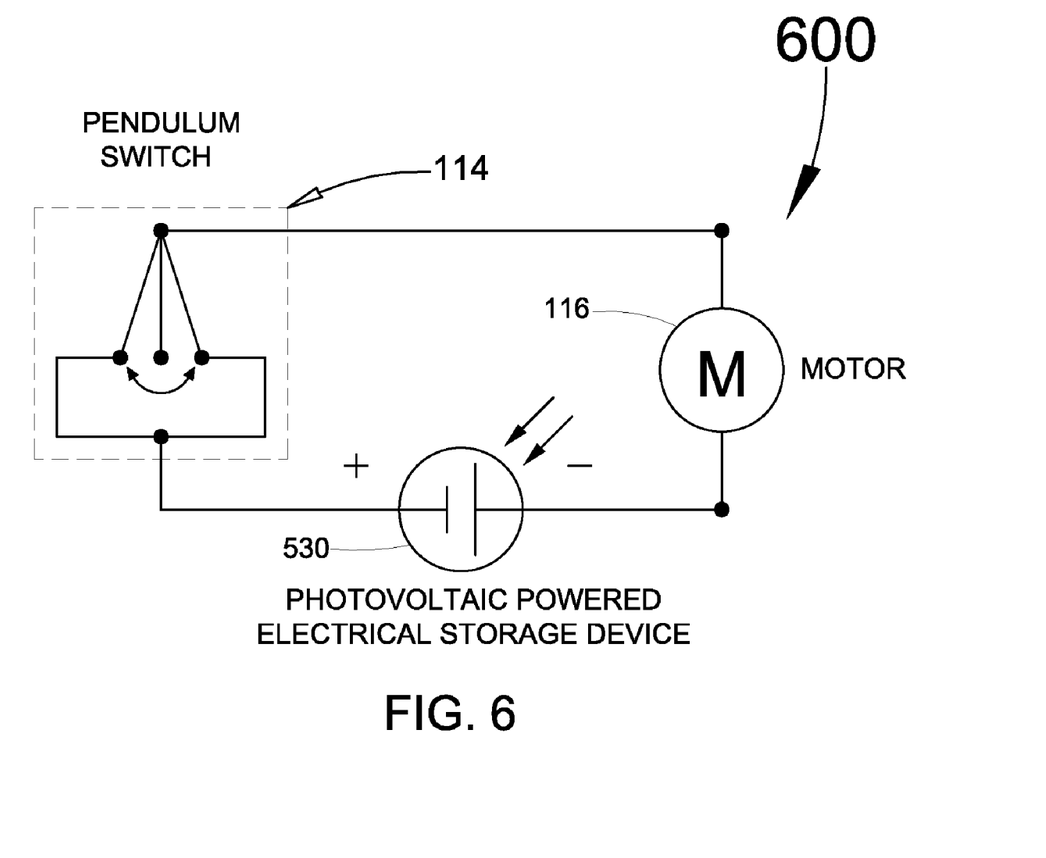
FIG. 6 is a schematic diagram illustrating the electrical communication means of FIG. 5.

Referring to FIG. 6, a schematic diagram 600 of FIG. 5, we see the electrical communication between the motor 116, pendulum actuated switch 114 and photovoltaic powered storage device 530.

With the present invention having been described in one or more preferred embodiments, those skilled in the art will recognize that various changes may be made thereto without departing from the spirit and scope of the present invention, which is set forth in the appended claims.

ADVANTAGES

This invention is generally similar to the aforementioned prior art references pertaining to automatic leveling apparatus in terms of application, as both cited prior art references aim to correct the misalignment of an object suspended from a mounting point automatically. However, the present invention substantially differs from the previously mentioned prior art, in both composition and mechanism, on how said purpose may be achieved and offers more advantageous features. To with:

Firstly, the leveling mechanism in the frame leveler mentioned in U.S. Publication No. 20060278799, published on 14 Dec. 2006 to Newman, is driven by a pivotable bob that points downward in a direction parallel to the force of gravity. The levelness of the picture frame can be achieved by maintaining the equilibrium. The present invention uses a simple pendulum actuated mechanism to sense an out of level condition and initiate the leveling sequence for an object suspended from a mounting point.

Secondly, the weights of the bobs in the aforementioned prior art need to be adequate to counter the weight of the frame to facilitate leveling. Consequently, a proportionally matched set of bobs must be attached to the frames of various weights, increasing design complexity and making the apparatus bulky and an impractical attachment to the back of a frame whose object is to rest near perpendicular against a flat surface. In the present invention, a low profile and ultra light automatic leveling apparatus is offered;

Thirdly, the frame leveler requires the installation of its various parts on the different areas of the suspended or hung object. While the pendulum actuated automatic leveler is a one-piece, compact apparatus easily attachable to the back of an object prior to hanging;

Lastly, the frame leveler can only let out the extensible cable on the high side of the object during leveling operations until the reel is empty, at which time it loses its ability to automatically level said object. Resultantly, human intervention is necessary to lift the weight of the frame off of the leveling mechanism so that the extensible cables that suspend the frame can retract back into their respective reels. Once the mechanism is reset, it can again return an object suspended from a mounting point to a level orientation. In the present invention, the object suspended from a mounting point will automatically adjust to a level state, without human intervention, for an indefinite period.

The U.S. Patent Publication No. 20070214669, published on 20 Sep. 2007 to Van Luchene and Mueller, involving an automated leveling apparatus heretofore mentioned is composed of several elements similar to the present invention. However, the present invention presents a novel mechanism and process of self-leveling that involves structures very distinct from that of the automated leveling apparatus, to with:

First, in automated leveling apparatus, the realignment of the misaligned object is achieved by the combination of a wheel turning and friction generated when the wheel is resting against a generally smooth, flat, and unmovable plane, such as a wall. In the present invention, the realignment of the misaligned object is carried out by a shift lever assembly that is actuated by a pendulum switch, automatically adjusting the angle of said object to a level orientation without the need of a smooth, flat and unmovable plane to work against;

Second, based on preceding paragraph, for the automated leveling apparatus to work, the misaligned object should be completely resting/leaning on a flat plane that extends beyond all four corners of the object. On the other hand, the automatic leveling apparatus of the present invention utilizes a shift lever assembly that is effective on virtually any surface, including cylindrical or irregular shaped columns and installations where the plane upon which the object rests does not extend beyond all boundaries of the object.

Third, the automated leveling apparatus requires a material that will aid in generating traction or friction to work, an addition that is completely unnecessary in the present invention as its operation is not dependant on the plane on which it rests;

Fourth, the gliding of the wheels of the automated leveling apparatus may cause undesirable marks on the surface. Accordingly, a support device or glide buttons are required to balance the suspended or hung object properly, substantially offsetting the width of the installed apparatus and creating additional cost and complexity that are not required in the present invention;

Fifth, the automated leveling apparatus requires the installation of its various parts on the different areas of the suspended or hung object. While the pendulum actuated automatic leveler is a one piece, compact apparatus easily attachable to the back of an object prior to hanging;

Sixth, unlike in the present invention, to alert the user that the automated leveling apparatus is functioning, the installation of a buzzer or Light Emitting Diode (LED) on the automated leveling apparatus is necessary. In the case of the pendulum actuated automatic leveler, the leveling process takes the object substantially out of level before returning to equilibrium, thereby giving a visual indication of the apparatus' operation.

Seventh, in order to realign the misaligned object the motor, gear, and wheel of the automated leveling apparatus turn in one direction when the tilt is on the right side of the object to be leveled and in the opposite direction if the tilt is on the left side. This requires additional or more complex motor(s) and circuitry. The leveling mechanism of pendulum actuated automatic leveler only moves in one direction when realigning a misaligned object, requiring only one simple motor and reducing circuit complexity; and Eight, the tilt mechanism of the present invention is scalable and can detect tilt measuring as little as ¼ or 0.25 of a degree.

We claim:

1. An automatic apparatus for leveling objects suspended from a mounting point, on an even or uneven plane, to an angle relative to any reference comprising:
   (a) a receptacle base structure providing a means for attachment to an object to be leveled;
   (b) a shift lever assembly operably connected to the receptacle base structure and configured to determine the center of gravity of the entire leveling apparatus;
   (c) a means to convert electrical energy to rotational motion that is mechanically connected to the shift lever assembly;
   (d) a pendulum actuated switch that is electrically connected to the means to convert electrical energy to rotational motion; and
   (e) an electrical storage device completing the electrical circuit which includes the pendulum switch and the means to convert electrical energy to rotational motion.

2. The automatic leveling apparatus in claim 1, further comprising a photovoltaic cell or array as a means to extend the electrical storage capacity.

3. The automatic leveling apparatus in claim 1 wherein said shift lever assembly comprising:
   (a) a first lever having an elongated lever arm with three bores formed in a vertical manner along a pivot axis thereof with its middle bore located in between the upper and lower bore serving as the pivot point of the elongated lever arm and enables the reception of a support post fixedly attached to the receptacle base structure; and
   (b) a second lever having a wheel-like driven gear with a rigid axle fixedly attached to it pivotally mounted on the center of gravity of the suspended or hung article, a worm-like driving gear which interlocks with said wheel-like driven gear, and a planetary motor which has an output shaft to receive and maneuver the wheel-like driven gear in single forward direction.

4. The automatic leveling apparatus in claim 1, wherein said pendulum actuated switch comprising:
   (a) a pendulum member with a weight positioned near the bottom part thereof and a conductor pin with protruding ends integrally attached at its end; and
   (b) a solid rectangular shaped pedestal member situated underneath said pendulum member with an open slot in its upper center surface and a pair of conductor plates mounted on either side of the inner notch formed by the aforementioned open slot, which communicate with the planetary motor through the connecting electrical wires.

5. A method of leveling articles suspended from a mounting point, on an even or uneven plane, comprising:
   (a) providing a pendulum actuated switch that activates in response to minimal inclination or tilt of its pendulum member, that when hanging solely under the influence of gravity, its position shifts horizontally and the conductor pin attached to its lowest edge contacts the conductor plates on either side,
   (b) contacting of the conductor pin on the conductor plates completes the circuit and allows electrical current to flow and activate the planetary motor,
   (c) activating the planetary motor causes the worm-like driving gear which interlocks with the wheel-like driven gear of the shift lever assembly to rotate in a single forward direction,
   (d) rotating of the interlocking worm-like driving gear and wheel-like driven gear of the shift lever assembly produces a single rotational force which shifts the elongated lever arm toward the pivot axle, (e) leveling occurs when the elongated lever arm of the pendulum actuated switch, solely under the influence of gravity, returns to its original vertical orientation and the conductor pin is no longer in contact with either side of the pair of conductor plates, opening the electrical circuit and stopping the motor from rotating.

\* \* \* \* \*